G. BARBER.
COMBINED FENDER AND NON-SKID AUTOMATIC BRAKE.
APPLICATION FILED DEC. 3, 1919.

1,402,279.

Patented Jan. 3, 1922.

UNITED STATES PATENT OFFICE.

GEORGE BARBER, OF CLEVELAND HEIGHTS, OHIO.

COMBINED FENDER AND NONSKID AUTOMATIC BRAKE.

1,402,279.   Specification of Letters Patent.   Patented Jan. 3, 1922.

Application filed December 3, 1919. Serial No. 342,046.

*To all whom it may concern:*

Be it known that I, GEORGE BARBER, a citizen of the United States, and resident of Cleveland Heights village, in the county of Cuyahoga and State of Ohio, have invented certain new and useful Improvements in Combined Fender and Nonskid Automatic Brakes, of which I hereby declare the following to be a full, clear, and exact description, such as will enable others skilled in the art to which it appertains to make and use the same.

The objects of the invention are to provide a device for automatically stopping a motor driven car to prevent collisions and to avoid skidding upon the rubber tires.

Heretofore the tendency of a motor driven car provided with pneumatic or hard rubber tires has been to skid in a dangerous manner upon a wet road bed when the brakes have been applied.

In this device a shield or guard member is lowered and is drawn automatically underneath the tread surfaces of the wheels so that the tires will no longer come into contact with the road bed and the weight of the car will wholly rest upon the guard members. These are composed of metal plates which will not easily skid and which are preferably corrugated or roughened to resist skidding upon snow or ice.

This device is normally employed as a wheel guard and fender and is only employed as a non-skidding device when an emergency calls for its use.

The invention is hereinafter further described, illustrated in the accompanying drawings, and specifically pointed out in the claims.

Figure 1:
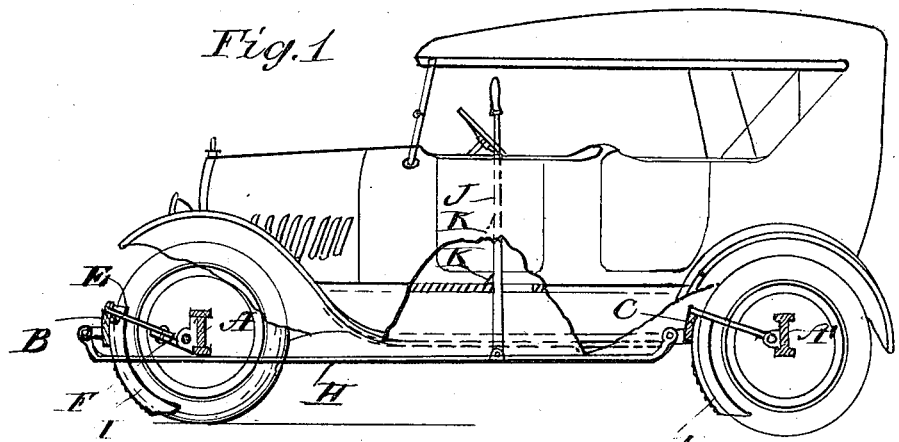
Figure 2:
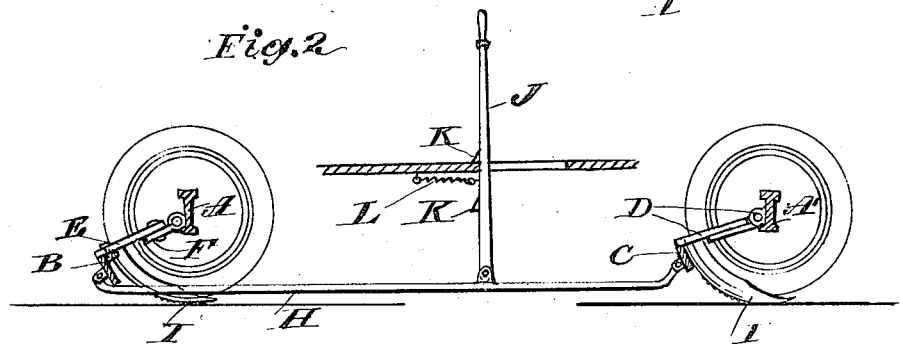
Figure 3:
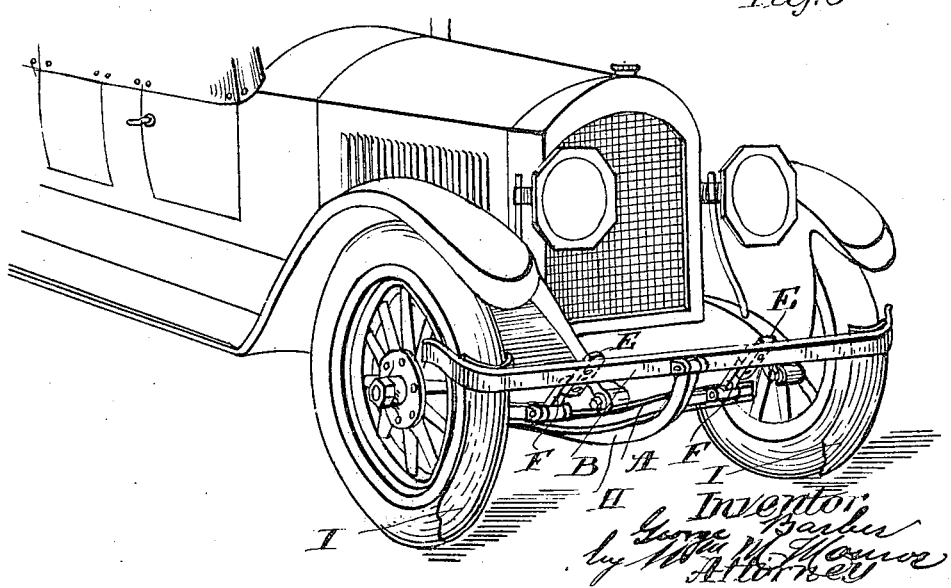

In the accompanying drawings, Fig. 1 is a longitudinal section of a motor car showing my device in the elevated position; Fig. 2 is a similar view showing the device in the lowered position; Fig. 3 is a perspective of the device.

In these views A, A', represent the wheel axles; B, is a fender bar horizontally supported in front of the front wheels, and C is a similar bar horizontally supported in front of the rear wheels.

The rear bar C is pivoted upon a bracket D attached to the rear axle, and the front bar is attached to the front axle by means of the links E, E, and arms F, F, pivoted upon the bracket G upon the front axle.

The bars B and C are connected by means of a linking bar H and from each fender bar B or C, depends the wheel guards I, I, which are preferably curved to conform to the shape of the tires.

The guards are preferably formed of thin metal and are raised and lowered with the bars.

A handle or lever J, attached to the connecting bar is employed to raise the bars, which preferably fall by gravity when the lever is released.

The lever J is provided with projections K, or other retaining means, which engage the floor of the car and prevent accidental operation thereof.

A spring L retains the bar in locking position. When the machine is running too fast or is in danger of a collision, the lever J is released and the bars B and C fall thus lowering the guards I, I, and as soon as the tires engage with the lower ends of these guards, the tips of the guards, which are flexible at their extremities, are drawn underneath the wheels, thus removing them entirely from contact with the road bed.

The wheels will then rotate freely within the guards without communicating movement to the machine, until the power is shut off.

The weight of the machine will rest upon the guards which upon an ordinary brick or asphalt pavement will not skid rapidly and the lower surfaces of guards can be roughened to prevent skidding on snow or ice.

Since the device will not be used in this manner very often and only in a great emergency the metal guards will last a long time.

The front wheels of an automobile are pivoted to swing upon the extremities of the axles, and hence to permit the front guards to do the same, the brackets supporting the front fender bar are connected therewith by means of the links E described.

Since the curved guards inclose the front edges of the tires of the front wheels, the guards will swing with the wheels.

Having described the invention what I claim as new and desire to secure by Letters Patent is:

1. In a device for the purpose set forth, the combination with the wheels and axles of a power-driven vehicle, of arms pivotally supported upon each axle, a transverse bar connecting the arms on each axle, the front transverse bar comprising a fender extending across the front of the machine and front wheels, a guard depending in front of each wheel and attached to its respective transverse bar, a longitudinal bar connecting said transverse bars, said longitudinal and transverse bars depressible to lower said guards into engagement with said wheels and road bed, said front guards partially encircling said front wheels, and together with said front bar, displaceable laterally with the movements of said front wheels.

2. In a device for the purpose set forth, the combination with the wheels and axles of a power-driven vehicle, of arms pivotally supported upon each axle, a transverse bar connecting the arms on each axle, the front transverse bar comprising a fender extending across the front of the machine and front wheels, a guard depending in front of each wheel and attached to its respective transverse bar, a longitudinal bar connecting said transverse bars, said longitudinal and transverse bars depressible to lower said guards into engagement with said wheels and road bed, said front guards partially encircling said front wheels and together with said front bar displaceable laterally with the movements of said front wheels, and a lever for raising and lowering said longitudinal bar.

3. The combination with the wheels and axles of a motor-driven vehicle, of a transverse bar extending across the front of the vehicle and in front of the front wheels thereof, and a transverse bar extending in front of the rear axle and rear wheels thereof, wheel guards depending from said transverse bars, arms upon said axles supporting said bars, the arms upon said front axle provided with vertical pivots permitting lateral swinging movement of said front bar and guards thereon, the guards upon the front wheels partially encircling the same and laterally movable therewith.

In testimony whereof, I hereunto set my hand this 22 day of September, 1919.

GEORGE BARBER.

In presence of—
S. W. SANGSTER,
WM. M. MONROE.